United States Patent
Hirano

(10) Patent No.: US 8,298,456 B2
(45) Date of Patent: Oct. 30, 2012

(54) SILICONE RESIN COMPOSITION

(75) Inventor: Keisuke Hirano, Osaka (JP)

(73) Assignee: Nitto Denko Corporation, Osaka (JP)

( * ) Notice: Subject to any disclaimer, the term of this patent is extended or adjusted under 35 U.S.C. 154(b) by 45 days.

(21) Appl. No.: 13/017,198

(22) Filed: Jan. 31, 2011

(65) Prior Publication Data

US 2011/0186792 A1 Aug. 4, 2011

(30) Foreign Application Priority Data

Feb. 1, 2010 (JP) ................................. 2010-019889

(51) Int. Cl.
*F21V 9/04* (2006.01)
*F21V 9/06* (2006.01)
*G02B 5/22* (2006.01)
*G02B 5/26* (2006.01)
*B05D 3/02* (2006.01)

(52) U.S. Cl. .......... 252/589; 427/387; 427/515; 522/99; 524/432; 524/588; 524/783; 524/858; 525/477

(58) Field of Classification Search .................. 252/589; 264/1.36; 525/477; 257/433, E31.117, 791, 257/E23.119; 524/413, 430, 432, 433, 588, 524/781, 780, 783, 785, 786, 858, 860, 847, 524/547; 528/10, 9, 33; 522/99; 427/515, 427/387; 430/326, 319; 428/338; 977/338

See application file for complete search history.

(56) References Cited

U.S. PATENT DOCUMENTS

2007/0260008 A1* 11/2007 Saito et al. ............... 524/547
2009/0163654 A1* 6/2009 Hirano ..................... 524/783
2010/0019399 A1* 1/2010 Kimura et al. ............ 257/791
2010/0286322 A1 11/2010 Yabuki et al.

FOREIGN PATENT DOCUMENTS

| JP | 2005-213482 A | | 8/2005 |
| JP | 2008-297396 A | | 12/2008 |
| JP | 2009-120721 A | | 6/2009 |
| JP | 2009-173866 | * | 8/2009 |

* cited by examiner

*Primary Examiner* — Bijan Ahvazi
(74) *Attorney, Agent, or Firm* — Sughrue Mion, PLLC

(57) ABSTRACT

The present invention relates to a silicone resin composition including a silicone resin and metal oxide fine particles dispersed therein, the silicone resin being obtained by reacting a siloxane derivative having at least one selected from the group consisting of an alkoxysilyl group and a silanol group at a molecular end thereof and having a weight-average molecular weight (Mw) as determined by a gel permeation method of 300 to 6,000, with silica fine particles having silanol groups on a surface thereof.

10 Claims, 1 Drawing Sheet

SILICONE RESIN COMPOSITION

FIELD OF THE INVENTION

The present invention relates to a silicone resin composition. More particularly, the invention relates to a silicone resin composition excellent in transmitting property in the visible light region and ultraviolet ray-blocking property, and it relates to molded products of the composition.

BACKGROUND OF THE INVENTION

The ultraviolet rays contained in sunlight have high energy and, hence, cleave carbon-carbon bonds of a polymer with the aid of oxygen or water, thereby deteriorating the polymer. Because of this, additives such as an ultraviolet absorber are incorporated into general polymers.

Ultraviolet absorbers include organic compounds and inorganic compounds. Examples of the organic ultraviolet absorbers include benzotriazole compounds and benzophenone compounds. Such organic compounds, however, are apt to be deteriorated by irradiation with ultraviolet rays and are hence deprived of the effect thereof with the elapse of time.

On the other hand, metal oxides such as zinc oxide and titanium oxide are known as inorganic ultraviolet absorbers. Although these metal oxides have the property of absorbing ultraviolet rays, the metal oxides become transparent within the visible light region as the particle size thereof decreases. Consequently, resin compositions which contain a metal oxide having a small particle size transmit visible light but block ultraviolet rays.

However, when the particle size of those metal oxides is reduced, the surface of the particles is activated and comes to have a photocatalytic activity. For example, such fine particles induce oxidation-reduction reactions. Of those metal oxides, titanium oxide has a high catalytic activity, and decomposes and deteriorates the matrix resin itself. In addition, metal oxide fine particles have a problem that it is difficult to disperse the particles in a matrix resin because the particles are fine particles and the poorly dispersed state impairs the transparency of the resin.

Techniques of treating the surface of metal oxide fine particles with a surface-treating agent, e.g., a silane coupling agent, are known. For example, in patent document 1, surface-treated zinc oxide fine particles which are highly transparent in the visible light region and exhibit high blocking properties in the ultraviolet region and which have no photocatalytic activity are produced by mixing a dispersion of zinc oxide fine particles in a solvent with a silane compound, subsequently heat-treating and drying the mixture, and disaggregating the resultant dry particles.

Also known is a method in which dispersion of fine particles is enhanced using a dispersant or using a bead mill or the like. For example, in patent document 2, a dispersant based on a polyether/phosphoric ester compound is used to enhance dispersion of fine particles. There also is a problem that when particles in a solid state are added to and dispersed in a solution, aggregates are apt to generate and the aggregation results in a decrease in transparency and an increase in haze. Patent document 3 discloses, as a measure for overcoming that problem, a technique in which a resin composition having excellent transparency is prepared by treating zinc oxide fine particles having a number-average particle diameter of 0.5 to 20 nm, with a specific silane compound to thereby prepare surface-modified zinc oxide fine particles which are in a liquid state and dispersing these fine particles directly in a resin.

Patent Document 1: JP-A-2009-120721
Patent Document 2: JP-A-2005-213482
Patent Document 3: JP-A-2008-297396

SUMMARY OF THE INVENTION

However, the smaller the particle size of metal oxide fine particles, the less the inhibition of the catalytic activity of the particle surface which is attained by treatment with a surface-treating agent. Resin compositions containing such fine particles dispersed therein have poor weatherability.

An object of the invention is to provide a silicone resin composition which has excellent transparency in the visible light region, has ultraviolet ray-blocking properties, and has excellent heat resistance and weatherability. Another object is to provide molded products of the composition.

The present inventors made investigations in order to overcome the problems. As a result, the inventors have found that a silicone resin composition which blocks ultraviolet rays while retaining transparency in the visible light region and which has excellent heat resistance and weatherability is obtained by dispersing specific metal oxide fine particles in a silicone resin obtained by reacting a siloxane derivative having an alkoxysilyl group and/or a silanol group at a molecular end thereof and having a weight-average molecular weight (Mw) as determined by the gel permeation method of 300 to 6,000, with silica fine particles having silanol groups on the surface thereof. The invention has been thus completed.

Namely, the present invention relates to the following (1) to (11).

(1) A silicone resin composition including a silicone resin and metal oxide fine particles dispersed therein, the silicone resin being obtained by reacting a siloxane derivative having at least one selected from the group consisting of an alkoxysilyl group and a silanol group at a molecular end thereof and having a weight-average molecular weight (Mw) as determined by a gel permeation method of 300 to 6,000, with silica fine particles having silanol groups on a surface thereof.

(2) The silicone resin composition according to (1), in which the siloxane derivative has an alkoxy group in an amount of 10 to 45% by weight per one molecule thereof.

(3) The silicone resin composition according to (1) or (2), in which the siloxane derivative contains a disilanol derivative which has a silanol group at each of both molecular ends thereof and has a weight-average molecular weight as determined by the gel permeation method of 300 to 3,000.

(4) The silicone resin composition according to any one of (1) to (3), in which the silica fine particles have an average particle diameter of 1 to 100 nm.

(5) The silicone resin composition according to (4), in which the silica fine particles are a colloidal silica having an average particle diameter of 1 to 100 nm.

(6) The silicone resin composition according to any one of (1) to (5), in which the metal oxide fine particles have an average particle diameter of 1 to 100 nm and a maximum-absorption wavelength of 250 to 450 nm.

(7) The silicone resin composition according to any one of (1) to (6), in which the metal oxide fine particles are fine particles obtained by treating surfaces of fine particles of at least one metal oxide selected from the group consisting of titanium oxide, zinc oxide and cerium oxide, with a silane derivative having an alkoxysilyl group at a molecular end thereof and having a weight-average molecular weight (Mw) as determined by the gel permeation method of 100 to 1,000.

(8) The silicone resin composition according to (7), in which the silane derivative is a compound represented by formula (IV):

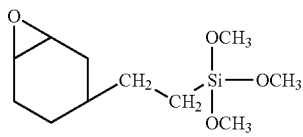

or a compound represented by formula (V):

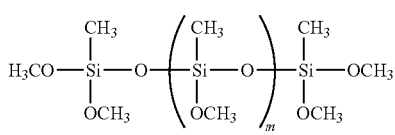

in which m represents an integer of 1 or larger.

(9) A hardcoat material obtained by applying the silicone resin composition according to any one of (1) to (8) on a substrate and drying the composition.

(10) A silicone resin sheet obtained by applying the silicone resin composition according to any one of (1) to (8) on a substrate and drying the composition.

(11) A silicone resin film obtained by applying the silicone resin composition according to any one of (1) to (8) on a substrate and drying the composition.

The silicone resin composition of the invention has excellent effects that the composition has excellent transparency in the visible light region and, despite this, blocks ultraviolet rays and that the composition has excellent heat resistance and weatherability.

DETAILED DESCRIPTION OF THE INVENTION

Figure 1:
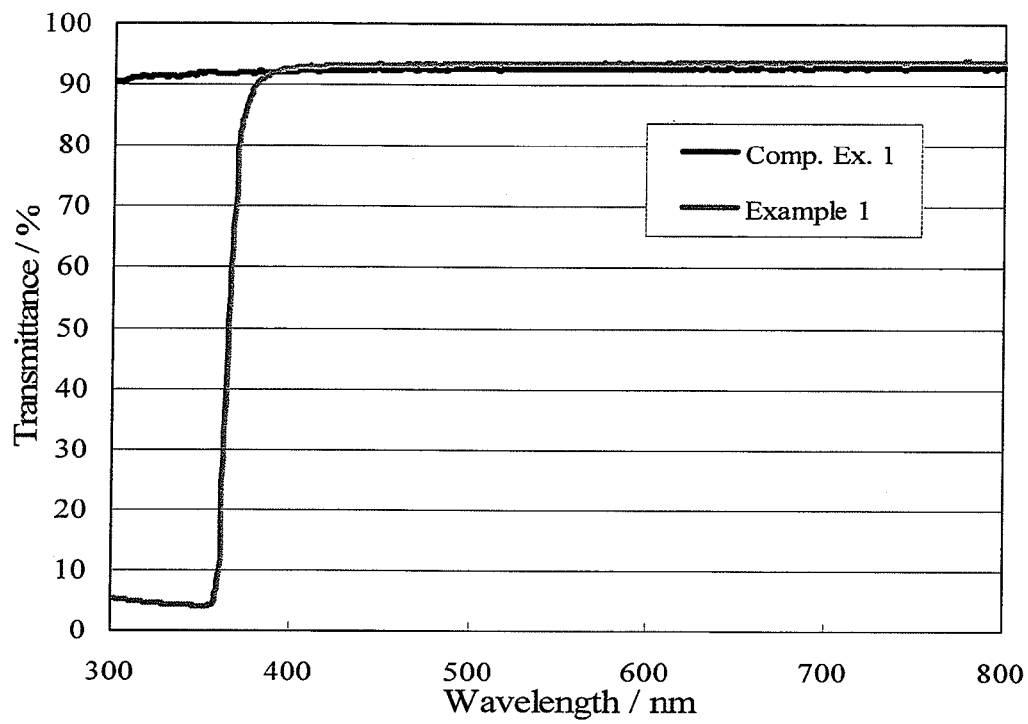
FIG. 1 is a graph showing light transmission spectra of sheets obtained from the compositions of Example 1 and Comparative Example 1.
Figure 2:
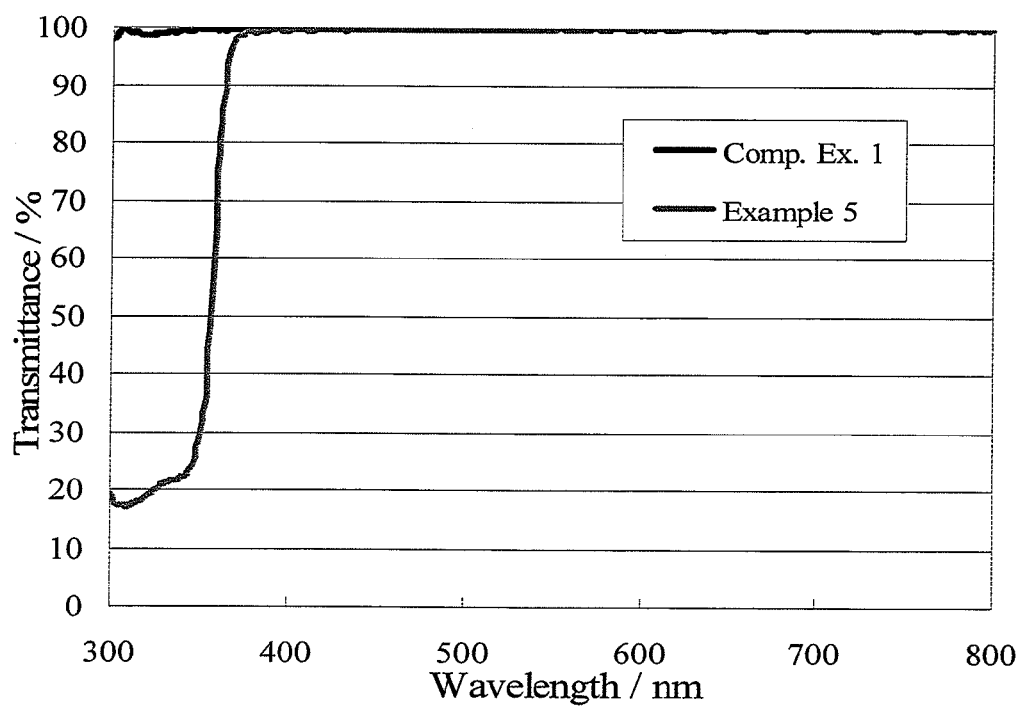
FIG. 2 is a graph showing light transmission spectra of sheets obtained from the compositions of Example 5 and Comparative Example 1.

The silicone resin composition of the invention contains a silicone derivative and metal oxide fine particles, and a great feature thereof is that specific metal oxide fine particles (referred to also as fine particles B) is dispersed in a silicone resin (referred to also as silica fine particle-containing silicone resin) obtained by reacting a siloxane derivative having an alkoxysilyl group and/or a silanol group at a molecular end thereof and having a weight-average molecular weight (Mw) as determined by the gel permeation method of 300 to 6,000, with silica fine particles having silanol groups on the surface thereof (referred to also as fine particles A).

Silicone resins are hydrophobic and have high water repellency, and it is therefore difficult to disperse hydrophilic metal oxide fine particles therein. In the invention, silica fine particles having silanol groups on the surface thereof (fine particles A) are hence reacted with a siloxane derivative having a reactive alkoxysilyl group and/or silanol group at a molecular end thereof, whereby the fine particles A become capable of being held and dispersed in silicone resins. As a result, a composition which not only has the heat resistance inherent in silicon resins but also has improved weatherability and excellent mechanical strength is obtainable because the silica fine particles as an inorganic component have been tenaciously bonded through reaction. This silicone resin composition has excellent transparency because the silica fine particles have been satisfactorily dispersed in the silicone resin, and further has better stability than general organic polymers. However, it was found that this resin composition decreases in stability by the action of ultraviolet rays, etc. when exposed to an outdoor environment or the like over a prolonged time period. The stability during storage can be improved by further incorporating metal oxide fine particles (fine particles B) which have high transparency in the visible light region and have high blocking properties in the ultraviolet region. Consequently, it is possible to obtain a silicone resin composition which, besides having those properties, has excellent transparency in the visible light region, blocks ultraviolet rays, and has excellent heat resistance and weatherability.

The silicone resin composition of the invention includes a siloxane derivatives, silica fine particles having silanol groups on the surface thereof (fine particles A), and metal oxide fine particles (fine particles B).

The siloxane derivative in the invention has a reactive alkoxysilyl group and/or silanol group at a molecular end thereof. It is preferred that this derivative should be a derivative obtained using a compound represented by the following formula (I):

in which $R^1$ and $R^2$ each independently represent an alkyl group or an aromatic group, and $R^3$ and $R^4$ each independently represent a hydrogen atom or an alkyl group, and/or using a compound represented by formula (II):

in which $R^5$, $R^6$, and $R^7$ each independently represent a hydrogen atom or an alkyl group, and X represents a monovalent organic group.

The derivative obtained using a compound represented by formula (I) and/or a compound represented by formula (II) is obtained by hydrolyzing and condensation-polymerizing a compound represented by formula (I) alone, a compound represented by formula (II) alone, or a mixture of a compound represented by formula (I) and a compound represented by formula (II), and the composition thereof is not particularly limited.

$R^1$ and $R^2$ in formula (I) each independently represent an alkyl group or an aromatic group. The number of carbon atoms of the alkyl group is preferably 1 to 18, more preferably 1 to 12, even more preferably 1 to 6, from the standpoints of controlling the hydrophilicity/hydrophobicity of the surface of the fine particles, efficiency of the polycondensation reaction of the siloxane derivative(s), etc. Examples of the alkyl group include methyl, ethyl, propyl, and isopropyl. Of these, it is especially preferred that $R^1$ and $R^2$ each independently are methyl or an aromatic group.

$R^3$ and $R^4$ in formula (I) each independently represent a hydrogen atom or an alkyl group. The number of carbon atoms of the alkyl group is preferably 1 to 4, more preferably 1 to 2, from the standpoints of reactivity with the surface of the fine particles and the hydrolysis rate. Examples of the alkyl group include methyl, ethyl, propyl, isopropyl, and butyl. Of these, methyl and ethyl are preferred.

$R^5$, $R^6$, and $R^7$ in formula (II) each independently represent a hydrogen atom or an alkyl group. The number of carbon atoms of the alkyl group is preferably 1 to 4, more preferably 1 to 2, as in the alkyl groups represented by $R^3$ and $R^4$ in formula (I). Examples of the alkyl group include methyl, ethyl, propyl, isopropyl, and butyl. Of these, methyl and ethyl are preferred.

X in formula (II) represents a monovalent organic group, and can be any of various functional groups from the standpoint of imparting properties suited for applications of the silicone resin composition to be obtained. Examples thereof include alkyl groups, phenyl, glycidyl, vinyl, epoxycyclohexyl, amino, and a thiol group. These groups (e.g., glycidyl) may contain any other desired atom(s), e.g., oxygen atom, and examples of such groups include methacryloxypropyl, glycidoxypropyl, epoxycyclohexylethyl, and aminopropyl.

Methods for hydrolyzing and condensation-polymerizing a compound represented by formula (I) alone, a compound represented by formula (II) alone, or a mixture of a compound represented by formula (I) and a compound represented by formula (II) are not particularly limited, and the hydrolysis and polycondensation can be conducted by a known method.

The siloxane derivative thus obtained has an alkoxysilyl group and/or a silanol group at a molecular end thereof.

In the invention, a compound represented by the following formula (III):

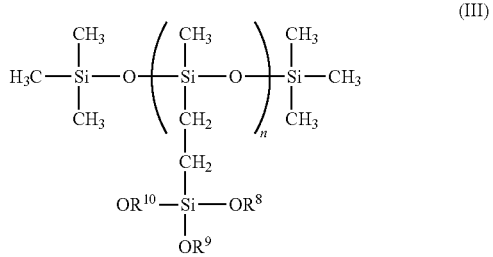

in which $R^8$, $R^9$, and $R^{10}$ each independently represent a hydrogen atom or an alkyl group, and n represents an integer of 1 or larger,
can be used as the siloxane derivative having an alkoxysilyl group and/or a silanol group at a molecular end thereof.

$R^8$, $R^9$, and $R^{10}$ in formula (III) each independently represent a hydrogen atom or an alkyl group. The number of carbon atoms of the alkyl group is preferably 1 to 4, more preferably 1 to 2, as in the alkyl groups represented by $R^3$ and $R^4$ in formula (I). Examples of the alkyl group include methyl, ethyl, propyl, isopropyl, and butyl. Of these, methyl and ethyl are preferred.

Symbol n in formula (III) represents an integer of 1 or larger, and preferably is an integer of 1 to 10.

The compound represented by formula (III) can be produced, for example, by mixing a methylhydrogensilicone oil with vinyltrimethoxysilane in toluene, sufficiently conducting replacement with nitrogen, adding a platinum catalyst thereto and reacting the mixture at 80° C. for 5 hours, subsequently cooling the mixture to room temperature, and distilling off the solvent. However, methods for producing the compound should not be limited to the example shown above.

In this specification, the term "siloxane derivative having a reactive alkoxysilyl group and/or silanol group at a molecular end thereof" means an alkoxysilane derivative having an alkoxysilyl group at a molecular end thereof, a silanol derivative having a silanol group at a molecular end thereof, or a siloxane derivative having an alkoxysilyl group and a silanol group at molecular ends thereof. One of these derivatives can be used alone, or two or more thereof can be used in combination. The silanol derivative preferably is a disilanol derivative having a silanol group at each of both molecular ends thereof.

The siloxane derivative in the invention has an alkoxy group in an amount of preferably 10 to 45% by weight, more preferably 15 to 45% by weight, per one molecule thereof, from the standpoint of reactivity with the silica fine particles. In the case where a plurality of derivatives are used as the siloxane derivative, it is preferred that the weighted-average value of the amount of alkoxy group of these derivatives should be within that range. The amount of alkoxy group means the molecular-weight proportion of the alkoxy group to one molecule of the derivative. In this specification, the amount of alkoxy group can be determined through $^1$H-NMR analysis and from a weight loss on heating.

The silanol functional group equivalent is preferably 50 to 500 mol/g, more preferably 50 to 250 mol/g, from the standpoint of affinity for the fine particles. In the case where a plurality of derivatives are used as the siloxane derivative, it is preferred that the weighted-average value of the silanol functional group equivalents of these derivatives should be within that range. In this specification, the silanol functional group equivalent can be determined through $^1$H-NMR analysis.

In this specification, the molecular weights of silicone derivatives are determined by gel permeation chromatography (gel permeation method; GPC). Consequently, the term "molecular weight of a siloxane derivative" in the invention means the weight-average molecular weight (Mw) determined by the gel permeation method, which is determined through a measurement made by the gel permeation method and a calculation. This molecular weight is referred to as "weight-average molecular weight (gel permeation method)" or simply as "weight-average molecular weight" or "molecular weight". The weight-average molecular weight of the siloxane derivative is 300 to 6,000, preferably 300 to 3,000, from the standpoint of solubility in reaction solvents. In the case where the siloxane derivative contains a disilanol derivative, the weight-average molecular weight thereof is preferably 300 to 3,000. In the case where a plurality of derivatives are used as the siloxane derivative, it is preferred that the weighted-average value of the weight-average molecular weights of these derivatives should be within that range.

In the invention, the siloxane derivative to be used can be a commercial product. Examples of suitable commercial products include "KC89" (weight-average molecular weight, 400; molecular-weight distribution, 300-500; methoxy content, 46% by weight), "KR500" (weight-average molecular weight, 1,000; molecular-weight distribution, 1,000-2,000; methoxy content, 28% by weight), "X-40-9225" (weight-average molecular weight, 3,000; molecular-weight distribution, 2,000-3,000; methoxy content, 24% by weight), and "X-40-9246" (weight-average molecular weight, 6,000; molecular-weight distribution, 4,000-10,000; methoxy content, 10% by weight), all manufactured by Shin-Etsu Chemical Co., Ltd. Examples thereof further include disilanol derivatives such as "X-21-3153" (weight-average molecular weight, 300; molecular-weight distribution, 200-400), "X-21-5841" (weight-average molecular weight, 1,000; molecular-weight distribution, 600-1,500), and "KF9701" (weight-average molecular weight, 3,000; molecular-weight distribution, 2,000-4,000), all manufactured by Shin-Etsu Chemical Co., Ltd. Furthermore, a siloxane derivative having a weight-average molecular weight within that range may be prepared by hydrolyzing or condensation-polymerizing any of these commercial products and used. Those siloxane derivatives can be used alone or used in combination of two or more thereof so long as the weight-average molecular weight thereof is within that range. Any desired two or more derivatives may be used in combination so long as the weighted-average value of the weight-average molecular weights thereof is within that range. Those compounds each have one or more methyl groups as a silicon-bonded substituent other than the alkoxy group and/or hydroxy group.

Silicone derivatives other than the siloxane derivatives may be contained in the silicone resin composition of the invention so long as the effects of the invention are not impaired. Such other silicone derivatives are not particularly limited. However, examples thereof include dimethyldimethoxysilane, dimethyldiethoxysilane, diphenyldimethoxysilane, diphenyldiethoxysilane, and tetraethoxysilane from the standpoints of reactivity with the silica fine particles and solubility in reaction solvents. When the siloxane derivatives and the other silicone derivatives are inclusively referred to as all silicone derivatives, then the total content of the siloxane derivatives in the silicone resin composition of the invention is preferably 50% by weight or more, more preferably 80% by weight or more, based on all silicone derivatives.

The silica fine particles (fine particles A) in the invention are not particularly limited so long as the fine particles have silanol groups on the surface thereof. However, the silica fine particles preferably have an average particle diameter in the range of 1 to 100 nm from the standpoint of ensuring transparency and colloidal silica having an average particle diameter in the range of 1 to 100 nm is particularly preferred. In this specification, the term "silica fine particles having silanol groups on the surface thereof" means silica fine particles which have undergone no surface treatment or silica fine particles which have undergone a surface treatment but on which silanol groups capable of reacting with the siloxane derivative are substantially present.

The colloidal silica preferably is one having a narrow particle size distribution, from the standpoint of ensuring transparency. More preferred is colloidal silica in which the primary particles are in the state of being dispersed without aggregating. The average particle diameter of the primary particles is preferably 1 to 100 nm, more preferably 1 to 50 nm, even more preferably 1 to 30 nm, from the standpoint of the transparency of molded products to be obtained from the composition. In this specification, the average particle diameter of fine particles can be determined through an examination of a dispersion of the particles for particle diameter by the dynamic light-scattering method or through a direct examination with a transmission electron microscope.

It is preferred that the fine particles in the colloidal silica should have undergone no surface treatment. It is also preferred that the pH of the surface of the fine particles and the pH of the aqueous colloidal silica dispersion should be on the acidic side or on the basic side from the standpoint of controlling the rate of the reaction to inhibit gelation. Specifically, the pH values thereof are preferably 2 to 4, more preferably 2 to 3, when on the acidic side, and are preferably 8 to 10, more preferably 9 to 10, when on the basic side.

Examples of suitable commercial products of the colloidal silica include the "Snowtex" series manufactured by Nissan Chemical Industries, Ltd.

The content of the silica fine particles (fine particles A) is preferably 3 to 40 parts by weight, more preferably 3 to 35 parts by weight, even more preferably 5 to 30 parts by weight, per 100 parts by weight of all silicone derivatives. When the content thereof is 3 parts by weight or more, there is no possibility of giving a composition which has too low strength thereby impairing handling ability. When the content thereof is 40 parts by weight or less, the resultant composition is not excessively hard and has satisfactory handling ability.

The metal oxide fine particles (fine particles B) in the invention have transparency in the visible light region and have the property of blocking ultraviolet rays. The term "metal oxide fine particles which block ultraviolet rays" means metal oxide fine particles which have a maximum-absorption wavelength in the range of preferably 250 to 450 nm, more preferably 250 to 420 nm. It is thought that such metal oxide fine particles hence can absorb ultraviolet rays to inhibit the rays from passing through.

Examples of the metal oxide fine particles include titanium oxide (maximum-absorption wavelength, 420 nm), zinc oxide (maximum-absorption wavelength, 380 nm), and cerium oxide (maximum-absorption wavelength, 400 nm). Preferred of these are titanium oxide and zinc oxide, which have no absorption in the visible light region. For use in applications where complete transparency in the visible light region is required, zinc oxide is more preferred. Incidentally, metal oxide fine particles can be prepared from a metal-oxide precursor having the constituent metal. Specifically, in the case where the metal oxide to be yielded is, for example, zinc oxide (ZnO), the metal oxide can be prepared by subjecting a metal salt such as zinc acetate, zinc nitrate, or zinc chloride to hydrolysis (hydrothermal synthesis, etc.) or pyrolysis. The kind of salt is not particularly limited, and examples thereof include acetate, nitrate, chloride, bromide, fluoride, cyanide, diethylcarbamate, oxalate, perchlorate, and trifluoroacetate. Of these, acetate and nitrate are preferred because these salts have a relatively low heat decomposition temperature. Such precursors may be anhydrides or may be hydrates.

The average particle diameter of the fine particles B is preferably 1 to 100 nm, more preferably 1 to 50 nm, even more preferably 1 to 20 nm, from the standpoint of the transparency of molded products to be obtained from the composition. It is preferred that the fine particles B should have a narrower particle size distribution.

The fine particles B to be used can be ones produced by a known method. However, fine particles B obtained by a process such as, for example, the hydrothermal synthesis method or the sol-gel method are preferred, because when particles in a solid state are added to and dispersed in a solution, aggregates are apt to generate. The fine particles obtained by the process can be mixed with resins while maintaining the dispersed state of the primary particles.

The fine particles B can be subjected to a surface treatment from the standpoint of imparting satisfactory dispersibility in the silica fine particle-containing silicone resin.

Preferred as a surface-treating agent for the fine particles B, from the standpoint of dispersibility in the silicone resin, is a silane derivative which has a reactive alkoxysilyl group at a molecular end thereof and has a weight-average molecular weight (Mw) as determined by the gel permeation method of 100 to 1,000. Examples hereof include an alkoxysilane derivative which has a reactive alkoxysilyl group at a molecular end thereof and has a weight-average molecular weight (Mw) as determined by the gel permeation method of 100 to 1,000 (silane coupling agent) and a siloxane derivative which has a reactive alkoxysilyl group at a molecular end thereof and has a weight-average molecular weight (Mw) as determined by the gel permeation method of 300 to 1,000. The alkoxysilane derivative and the siloxane derivative may contain an organic functional group (e.g., a methyl group) as a silicon-bonded substituent other than the alkoxy group.

The alkoxysilane derivative which has a reactive alkoxysilyl group at a molecular end thereof and has a weight-average molecular weight (Mw) as determined by the gel permeation method of 100 to 1,000 (silane coupling agent) is not particularly limited so long as the derivative is a known silane coupling agent having a molecular weight within that range. However, 2-(3,4-epoxycyclohexyl)ethyltrimethoxysilane, which is represented by formula (IV):

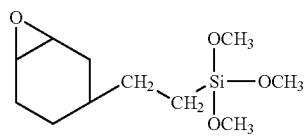

(IV)

is suitable. Compounds having an epoxycyclohexyl group in the molecule thereof have the effects of having relatively excellent heat resistance among silane coupling agents for use as surface-treating agents and of imparting satisfactory dispersibility. Incidentally, "KBM303" (molecular weight, 246.4), manufactured by Shin-Etsu Chemical Co., Ltd., is suitable as 2-(3,4-epoxycyclohexyl)ethyltrimethoxysilane.

Suitable examples of the siloxane derivative which has a reactive alkoxysilyl group at a molecular end thereof and has a weight-average molecular weight (Mw) as determined by the gel permeation method of 300 to 1,000 include compounds represented by formula (V):

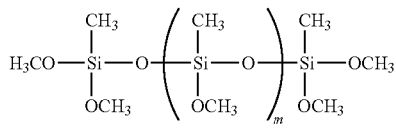

(V)

in which m represents an integer of 1 or larger.

Suitable as such derivatives are "KC89" (weight-average molecular weight, 400; molecular-weight distribution, 300-500; methoxy content, 46% by weight; organic functional group, methyl) and "KR500" (weight-average molecular weight, 1,000; molecular-weight distribution, 1,000-2,000; methoxy content, 28% by weight; organic functional group, methyl), both manufactured by Shin-Etsu Chemical Co., Ltd.

Also suitable as the siloxane derivative which has a reactive alkoxysilyl group at a molecular end thereof and has a weight-average molecular weight (Mw) as determined by the gel permeation method of 300 to 1,000 are compounds represented by formula (VI):

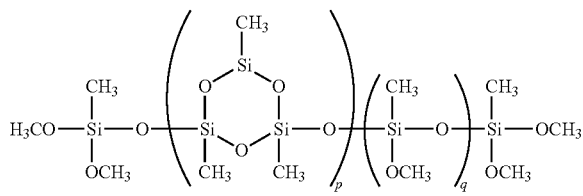

(VI)

in which p and q each represent an integer of 1 or larger.

The content of the surface-treating agent is preferably 50 to 1,000 parts by weight, more preferably 80 to 700 parts by weight, per 100 parts by weight of the metal oxide fine particles to be subjected to the surface treatment (or a precursor for the metal oxide).

Methods for the surface treatment are not particularly limited, and the surface treatment may be conducted by known methods. Examples thereof include a method in which metal oxide fine particles prepared beforehand and a surface-treating agent are stirred in a solvent at −10 to 30° C. for 6 to 24 hours (sol-gel method) and a method in which a precursor for metal oxide fine particles and a surface-treating agent are stirred in a solvent at 200 to 300° C. for 0.1 to 1 hour (wet method). In the case where zinc oxide particles are synthesized by the hydrothermal method, treatment with a surface-treating agent may be conducted simultaneously with particle generation, and the particles can be thereby rendered dispersible in the silicone resin, while being kept in the dispersed state.

The content of the metal oxide fine particles (fine particles B) is preferably 1 to 12 parts by weight, more preferably 2 to 10 parts by weight, per 100 parts by weight of all silicone derivatives. When the content thereof is 1 part by weight or more, the resin composition obtained can block ultraviolet rays. When the content thereof is 12 parts by weight or less, the resin composition is not excessively hard and has satisfactory handling ability.

In the invention, the silicone resin composition may contain metal oxide fine particles other than the silica fine particles (fine particles A) and the metal oxide fine particles (fine particles B) unless the effects of the invention are impaired thereby. Examples of the other metal oxide fine particles include known metal oxide fine particles. The total content of the fine particles A and B in all metal oxide fine particles used is preferably 80% by weight or more, more preferably 90% by weight or more, even more preferably substantially 100% by weight.

The silicone resin composition of the invention may contain additives, such as an aging inhibitor, modifier, surfactant, dye, pigment, discoloration inhibitor, and ultraviolet absorber other than the metal oxide fine particles, besides the siloxane derivative, silica fine particles, and metal oxide fine particles so long as the effects of the invention are not impaired thereby.

The silicone resin composition of the invention can be prepared, for example, by adding an organic solvent according to need to a dispersion of the silica fine particles, adjusting the pH of the solution to 2-4, subsequently reacting the silica fine particles at 40-80° C. with a resin solution containing the siloxane derivative, and then dispersing metal oxide fine particles in the resultant liquid reaction mixture. From the standpoint of improving the hydrophobicity of the silica fine particles to facilitate reaction with a high-molecular siloxane derivative, the fine particles may be reacted with another silicone derivative, such as dimethyldimethoxysilane or tetraethoxysilane, before being reacted with the siloxane derivative. In the invention, use may be made of a method in which a liquid obtained by dispersing metal oxide fine particles in a siloxane derivative is mixed with a dispersion of silica fine particles and polymerization reaction is thereafter conducted to prepare the silicone resin composition.

The organic solvent is not particularly limited. However, alcohols are preferred from the standpoint of enhancing compatibility between the siloxane derivative and the silica fine particles. More preferred are 2-propanol and 2-methoxyethanol. The amount of the organic solvent to be present is not particularly limited so long as the reaction proceeds sufficiently.

The silicone resin composition obtained can be formed into a sheet, for example, by applying the composition in an appropriate thickness on a release sheet (e.g., a polyethylene substrate) or glass substrate, the surface of which has been treated with a releasant, by a technique such as casting, spin coating, or roll coating, and drying the composition at such a temperature that solvent removal is possible. Consequently, the invention provides a sheet-shaped silicone resin molded product (hardcoat material, silicone resin sheet, or silicone resin film) obtained by applying the silicone resin composition of the invention on a substrate and drying the composition. Examples of the sheet-shaped molded product include molded products having a thickness of about 10 to 1,000 μm. The temperature at which the resin solution is dried cannot be unconditionally determined because the temperature varies depending on the kinds of the resin and solvent. However, the drying temperature is preferably 80 to 250° C. The drying may be conducted in two stages. In this case, the temperature in the first stage is preferably 80 to 150° C. and the temperature in the second stage is preferably 100 to 250° C.

The silicone resin composition of the invention has high light transmittance in the visible light region because the composition contains metal oxide fine particles having transparency in the visible light region. In the case where the silicone resin composition is formed into a sheet having a thickness of, for example, 10 to 500 μm, the transmittance of incident light having wavelengths of 400 to 700 nm is desirably 80% or more, preferably 82% or more, more preferably 85% or more, even more preferably 85 to 100%, especially preferably 90 to 100%. In this specification, light transmittance is measured by the method described in the Examples which will be given later.

Since the silicone resin composition of the invention contains metal oxide fine particles which block ultraviolet rays, the composition has low light-transmitting properties in the ultraviolet region. For example, in the case where the silicone resin composition is formed into a sheet having a thickness of 10 to 500 μm, the transmittance of incident light having wavelengths shorter than 400 nm is desirably 30% or less, preferably 20% or less, more preferably 15% or less, even more preferably substantially 0%.

EXAMPLES

The invention will be described below with reference to Examples, but the invention should not be construed as being limited by the Examples, etc.

[Molecular Weight of Silicone Derivative]

The molecular weight is determined as a value measured by gel permeation chromatography (GPC) in terms of polystyrene.

[Alkoxy Group Content of Silicone Derivative]

The alkoxy group content is calculated through determination by $^1$H-NMR analysis using an internal reference and from a value of weight loss on heating in differential thermal analysis/thermogravimetry.

[Average Particle Diameter of Fine Particles]

The term "average particle diameter of fine particles" in this specification means the average particle diameter of primary particles, and is 50% volume cumulative diameter ($D_{50}$) determined through an examination of a dispersion of the fine particles by the dynamic light-scattering method and a calculation.

[Maximum-Absorption Wavelength of Metal Oxide Fine Particles]

A dispersion solution of the metal oxide fine particles is examined as a sample with a spectrophotometer (U-4100, manufactured by Hitachi High-Technologies Corp.) in the wavelength range of 300 to 800 nm to obtain a UV spectrum, and the maximum-absorption wavelength therein is measured.

[Luminance-Maximum Wavelength of Metal Oxide Fine Particles]

A dispersion solution of the metal oxide fine particles is excited, as a sample, at a wavelength of 365 nm using Hitachi Fluorometer (F4500) to obtain a fluorescence spectrum, and the luminance-maximum wavelength therein is measured.

Production Example 1 for Metal Oxide Fine Particles (Fine Particles B)

Into a glass vessel for autoclave were introduced 1.54 g (4 mmol) of anhydrous zinc acetate, 8.97 g of 2-(3,4-epoxycyclohexyl)ethyltrimethoxysilane "KBM303" (manufactured by Shin-Etsu Chemical Co., Ltd.; molecular weight, 246.4) [36 mmol; 582 parts by weight per 100 parts by weight of the metal-oxide precursor (anhydrous zinc acetate)], and 80 mL of tetraethylene glycol. The glass vessel was placed in an autoclave (manufactured by Taiatsu Techno Corp.), and 30 g of tetraethylene glycol was introduced into the gap between the glass vessel and the reaction vessel of the autoclave, which was then closed. The reaction mixture was heated to 300° C. at a rate of 20° C./min with stirring, held at 300° C. for 10 minutes, and then gradually cooled to room temperature (25° C.). Thereafter, the solution obtained was subjected to precipitation from ethyl acetate, and the resultant yellow-white solid (fine particles of fluorescent zinc oxide) was recovered with a centrifugal separator. The fine particles obtained were redispersed in 2-propanol so as to result in a solid concentration of 20% by weight. The fine particles had an average particle diameter of 10 nm, and the solution obtained by redispersing the fine particles had a maximum-absorption wavelength of 370 nm and a luminance-maximum wavelength of 470 nm.

Production Example 2 for Metal Oxide Fine Particles (Fine Particles B)

Into a glass vessel for autoclave were introduced 1.54 g (4 mmol) of anhydrous zinc acetate, 8.0 g of a siloxane derivative having a reactive alkoxysilyl group at a molecular end ("KC89", manufactured by Shin-Etsu Chemical Co., Ltd.; weight-average molecular weight, 400; molecular-weight distribution, 300-500; organic functional group, methyl; methoxy group content, 46% by weight) [20 mmol; 519 parts by weight per 100 parts by weight of the metal-oxide precursor (anhydrous zinc acetate)], and 80 mL of tetraethylene glycol. The mixture was reacted in the same manner as in Production Example 1. The solution obtained was subjected to precipitation from diethyl ether, and the resultant yellow-white solid (fine particles of fluorescent zinc oxide) was recovered with a centrifugal separator. The fine particles obtained were redispersed in ethyl acetate so as to result in a solid concentration of 10% by weight. The fine particles had an average particle diameter of 11 nm, and the solution obtained by redispersing the fine particles had a maximum-absorption wavelength of 370 nm and a luminance-maximum wavelength of 470 nm.

Production Example 3 for Metal Oxide Fine Particles (Fine Particles B)

In 100 mL of anhydrous ethanol was dissolved 1.84 g (4 mmol) of zinc acetate dihydrate. This solution was cooled to 0° C. with stirring. A solution prepared by suspending 0.58 g (4 mmol) of lithium hydroxide monohydrate in 100 mL of anhydrous ethanol was added dropwise to the cooled solution over 30 minutes and mixed therewith. This mixture was reacted with stirring at 0° C. for 5 hours. Thereafter, a solution prepared by dissolving 2.0 g of methylmethoxysilane "KBM13" (manufactured by Shin-Etsu Chemical Co., Ltd.; molecular weight, 136.2) [36 mmol; 83 parts by weight per 100 parts by weight of all metal-oxide precursors (the zinc acetate dihydrate and the lithium hydroxide monohydrate)] in 2.0 g of anhydrous ethanol was added dropwise to the reaction mixture. After completion of the dropwise addition, the mixture was warmed to room temperature (25° C.) and stirred overnight. The solvent was distilled off, and fine particles of fluorescent zinc oxide were recovered. The fine particles obtained were redispersed in ethyl acetate so as to result in a solid concentration of 10% by weight. The fine particles had an average particle diameter of 12 nm, and the solution obtained by redispersing the fine particles had a maximum-absorption wavelength of 360 nm and a luminance-maximum wavelength of 460 nm.

Example 1

Into a vessel equipped with a stirrer, reflux condenser, and nitrogen introduction tube was introduced 5.0 g of a colloidal silica solution having an average particle diameter of 8 nm (trade name, "Snowtex OS"; manufactured by Nissan Chemical Industries, Ltd.; solid concentration, 20% by weight) (20 parts by weight per 100 parts by weight of the silicone derivative). Thereto were added 7.5 g of 2-propanol and 5.0 g of 2-methoxyethanol. Concentrated nitric acid was added to the resultant liquid to adjust the pH thereof to 2-3. Subsequently, this reaction mixture was heated to 80° C., and a solution prepared by dissolving 5.0 g of a siloxane derivative having an alkoxysilyl group at a molecular end ("X-40-9225", manufactured by Shin-Etsu Chemical Co., Ltd.; weight-average molecular weight, 3,000; molecular-weight distribution, 2,000-3,000; methoxy content, 24% by weight) in 5.0 g of 2-propanol was added dropwise thereto over 1 hour using a dropping funnel. The resultant mixture was reacted at 80° C. for 2 hours and then cooled to room temperature (25° C.). Under reduced pressure, the solvent was partially distilled off to obtain a solution. The metal oxide fine particles (fine particles B) obtained in Production Example 1 were added thereto so as to result in a solid concentration of the fine particles B of 5.0 parts by weight per 100 parts by weight of the silicone derivative. This mixture was stirred to disperse the fine particles B. Thus, a silicone resin composition was obtained.

Example 2

A silicone resin composition was obtained in the same manner as in Example 1, except that the metal oxide fine particles to be used in Example 1 were replaced with the metal oxide fine particles obtained in Production Example 2.

Example 3

A silicone resin composition was obtained in the same manner as in Example 2, except that in place of the solution prepared by dissolving 5.0 g of "X-40-9225" in 5.0 g of 2-propanol, use was made of a solution prepared by dissolving 2.8 g of "X-40-9225" and 1.2 g of a siloxane derivative having a silanol group at a molecular end ("X-21-3153", manufactured by Shin-Etsu Chemical Co., Ltd.; weight-average molecular weight, 300; molecular-weight distribution, 200-400) in 4.0 g of 2-propanol. The content of the silica fine particles was 25 parts by weight per 100 parts by weight of all silicone derivatives, and the content of the metal oxide fine particles was 6.3 parts by weight per 100 parts by weight of all silicone derivatives.

Example 4

A silicone resin composition was obtained in the same manner as in Example 2, except that in place of the solution prepared by dissolving 5.0 g of "X-40-9225" in 5.0 g of 2-propanol, use was made of a solution prepared by dissolving 3.2 g of a siloxane derivative having an alkoxysilyl group at a molecular end ("KR500", manufactured by Shin-Etsu Chemical Co., Ltd.; weight-average molecular weight, 1,000; molecular-weight distribution, 1,000-2,000; methoxy content, 28% by weight) in 5.0 g of 2-propanol. The content of the silica fine particles was 31 parts by weight per 100 parts by weight of the silicone derivative, and the content of the metal oxide fine particles was 7.8 parts by weight per 100 parts by weight of the silicone derivative.

Example 5

Into the same apparatus as in Example 1 was introduced 5.0 g of a colloidal silica solution having an average particle diameter of 20 nm (trade name, "Snowtex 0-40"; manufactured by Nissan Chemical Industries, Ltd.; solid concentration, 40% by weight) (36 parts by weight per 100 parts by weight of the silicone derivatives). Thereto were added 10.0 g of methanol and 2.0 g of 2-methoxyethanol. This mixture was heated to 60° C. A solution prepared by dissolving 0.5 g of tetraethoxysilane (molecular weight, 208.3) and 1.0 g of dimethylmethoxysilane "KBM22" (manufactured by Shin-Etsu Chemical Co., Ltd.; molecular weight, 120.3) in 2.0 g of methanol was added dropwise thereto over 5 minutes using a dropping funnel. The resultant mixture was reacted at 60° C. for 15 minutes and then cooled to room temperature (25° C.). Under reduced pressure, the solvent was distilled off until the weight of the reaction mixture decreased to about 5 g. Subsequently, 5.0 g of 2-propanol and 5.0 g of tetrahydrofuran were added to the residue, and this mixture was stirred to obtain an even solution. A solution prepared by dissolving 4.0 g of siloxane derivative "X-40-9225" in 4.0 g of 2-propanol was added dropwise to that solution over 20 minutes using a dropping funnel, and the resultant mixture was reacted at 60° C. for 2 hours. Subsequently, the reaction mixture was cooled to room temperature (25° C.), and the solvent was distilled off under reduced pressure. Thereafter, the metal oxide fine particles (fine particles B) obtained in Production Example 3 were added to the residue so as to result in a solid concentration of the fine particles B of 5.0 parts by weight per 100 parts by weight of all silicone derivatives. This mixture was stirred to disperse the fine particles B. Thus, a silicone resin composition was obtained.

Example 6

A silicone resin composition was obtained in the same manner as in Example 1, except that the metal oxide fine particles (fine particles B) were added so as to result in a content thereof of 2.0 parts by weight per 100 parts by weight of the silicone derivative.

Comparative Example 1

A silicone resin composition was obtained in the same manner as in Example 1, except that the metal oxide fine particles (fine particles B) were not added. The content of the silica fine particles was 20 parts by weight per 100 parts by weight of the silicone derivative.

Comparative Example 2

A silicone resin composition was obtained in the same manner as in Example 1, except that commercial ultraviolet absorber "Tinuvin 328" (manufactured by Ciba Japan; benzotriazole compound) was added so as to result in a solid concentration thereof of 0.34 parts by weight per 100 parts by weight of the silicone derivative, in place of the metal oxide fine particles (fine particles B) obtained in Production Example 1, which had been added in Example 1 so as to result in a solid concentration thereof of 5.0 parts by weight per 100 parts by weight of the silicone derivative. The content of the silica fine particles was 20 parts by weight per 100 parts by weight of the silicone derivative.

Comparative Example 3

Into a mayonnaise bottle having a capacity of 37 mL were introduced 1.0 g of a titanium oxide powder, 5.0 g of siloxane derivative "X-40-9225", and 8.0 g of 2-propanol. Twenty grams of zirconia beads having a diameter of 0.2 mm were added thereto, and this mixture was treated with a bead mill for 2 hours to disperse the titanium oxide particles. The solution obtained was transferred to the same reactor as in Example 1. One gram of water was added thereto, and the pH of the resultant mixture was adjusted to 2-3 with concentrated hydrochloric acid. Thereafter, the mixture was heated to 60° C., and a solution prepared by dissolving 3.0 g of siloxane derivative "X-40-9225" in 3.0 g of methanol was added dropwise thereto over 10 minutes using a dropping funnel. The resultant mixture was reacted at 60° C. for 1 hour and then cooled to room temperature (25° C.). The solvent was distilled off under reduced pressure to obtain a silicone resin composition. The content of the metal oxide fine particles was 12.5 parts by weight per 100 parts by weight of the silicone derivative.

Comparative Example 4

A mixture of 5.0 g of siloxane derivative "X-40-9225", 1.0 g of water, and 5.0 g of 2-propanol was prepared, and the pH thereof was adjusted to 2-3 with concentrated hydrochloric acid to obtain a solution containing a siloxane derivative having a weight-average molecular weight of 250. A silicone resin composition was obtained in the same manner as in Example 1, except that the siloxane-derivative-containing solution obtained was used.

Molded-Product Preparation Example 1

Each of the compositions obtained in Examples 1 to 4 and 6 and Comparative Examples 1, 2, and 4 was applied in a thickness of 100 μm on a PET substrate treated with a releasant. The composition applied was heated at 150° C. for 1 hour and then at 200° C. for 1 hour to prepare a sheet-shaped molded product (silicone resin sheet; thickness, 100 μm). With respect to the composition of Comparative Example 3, a sheet-shaped molded product (silicone resin sheet; thickness, 100 μm) was prepared therefrom in the same manner as in Example 1, except that the heat treatment was changed to 1-hour heating at 100° C. With respect to the composition of Example 5, the composition was applied to a glass plate in a thickness of 10 μm and subsequently heated at 100° C. for 1 hour and then at 200° C. for 1 hour to prepare a sheet-shaped molded product (silicone resin sheet; thickness, 10 μm).

The molded products obtained were evaluated for properties according to the following Test Examples 1 to 3. The results thereof are shown in Tables 1 and 2. The silicone resin sheet obtained from the composition of Comparative Example 4 was exceedingly brittle and was milk-white because of aggregation of the metal oxide fine particles. This comparative silicone resin sheet was hence unable to be evaluated.

Test Example 1

Light-Transmitting Property

Each silicone resin sheet is examined with a spectrophotometer (U-4100, manufactured by Hitachi High-Technologies Corp.) for transmission spectrum in the ultraviolet/visible light range of 300 to 800 nm, and the transmittances (%) at 300 nm, 450 nm, and 600 nm are calculated.

Test Example 2

Heat Resistance

Each silicone resin sheet obtained was allowed to stand still in a hot air type drying oven of 200° C. for 3 hours, and the appearance thereof was thereafter examined visually. The case where the sheet did not change in color from the initial state is indicated by "A", while the case where the sheet changed in color is indicated by "B".

Test Example 3

Weatherability

A sheet (thickness, 1 μm) prepared from a composition obtained by dissolving a commercial fluorescent substance (Rhodamine B; luminance-maximum wavelength, 543 nm) in poly(methyl methacrylate) (manufactured by Wako Pure Chemical Industries, Ltd.) in a concentration of 3.1% by weight was laminated as a protective layer to each silicone resin sheet obtained. This laminate was placed in a xenon weatherometer (X-2; manufactured by Suga Test Instruments Co., Ltd.) so that the sheet of the Example or Comparative Example faced upward, and was exposed to light at 2.5 kW for 24 hours. Thereafter, the sheet was taken out. This sheet was excited with Hitachi Fluorometer (F4500) at a wavelength of 365 nm, and the luminescence intensity at the luminance-maximum wavelength of 543 nm was measured. The retention of luminescence intensity (%) based on the luminescence intensity before the exposure, which was taken as 100(%), was calculated.

TABLE 1

|  |  | Example 1 | Example 2 | Example 3 | Example 4 | Example 5 | Example 6 |
|---|---|---|---|---|---|---|---|
| Silicone derivative | Siloxane derivative | X-40-9225 | X-40-9225 | X-40-9225 X-21-3153 | KR500 | X-40-9225 | X-40-9225 |
|  | Weight-average molecular weight[1)] | 3000 | 3000 | 2190 | 1000 | 3000 | 3000 |
|  | Other | — | — | — | — | tetraethoxysilane KBM22 | — |
| Silica fine particles (fine particles A) | Kind | Snowtex OS | Snowtex OS | Snowtex OS | Snowtex OS | Snowtex O-40 | Snowtex OS |
|  | Average particle diameter (nm) | 8 | 8 | 8 | 8 | 20 | 8 |
|  | Content[2)] | 20 | 20 | 25 | 33 | 36 | 20 |
| Metal oxide fine particles (fine particles B) | Precursor (metal salt) | anhydrous zinc acetate | anhydrous zinc acetate | anhydrous zinc acetate | anhydrous zinc acetate | zinc acetate•$2H_2O$ lithium hydroxide•$1H_2O$ | anhydrous zinc acetate |
|  | Surface-treating agent Kind | KBM303 | KC89 | KC89 | KC89 | KBM13 | KBM303 |
|  | Weight-average molecular weight | 246.4 | 400 | 400 | 400 | 136.2 | 246.4 |
|  | Amount used[3)] | 582 | 519 | 519 | 519 | 83 | 582 |
|  | Average particle diameter (nm) | 10 | 11 | 11 | 11 | 12 | 10 |
|  | Maximum-absorption wavelength (nm) | 370 | 370 | 370 | 370 | 360 | 370 |
|  | Luminance-maximum wavelength (nm) | 470 | 470 | 470 | 470 | 460 | 470 |
|  | Content[4)] | 5.0 | 5.0 | 6.3 | 7.8 | 5.0 | 2.0 |
| Other | Ultraviolet absorber | — | — | — | — | — | — |
| Light-transmitting property | Light transmittance (%) 600 (nm) | 93 | 92 | 92 | 93 | 99 | 99 |
|  | 450 (nm) | 93 | 92 | 92 | 92 | 99 | 99 |
|  | 300 (nm) | 5 | 10 | 8 | 11 | 19 | 28 |
| Heat resistance | Appearance | A | — | — | — | — | — |
| Weatherability | Retention of luminescence intensity (%) | 95 | — | — | — | — | — |

*X-40-9225 . . . Siloxane derivative containing alkoxysilyl group at molecular end; manufactured by Shin-Etsu Chemical; organic functional group, methyl; methoxy group content, 24% by weight
X-21-3153 . . . Disilanol derivative containing silanol groups at molecular ends; manufactured by Shin-Etsu Chemical; organic functional group, methyl
KR500 . . . Siloxane derivative containing alkoxysilyl group at molecular end; manufactured by Shin-Etsu Chemical; organic functional group, methyl; methoxy group content, 28% by weight
KBM22 . . . Dimethyldimethoxysilane; manufactured by Shin-Etsu Chemical
KBM303 . . . 2-(3,4-Epoxycyclohexyl)ethyltrimethoxysilane; manufactured by Shin-Etsu Chemical
KC89 . . . Siloxane derivative containing alkoxysilyl group at molecular end; manufactured by Shin-Etsu Chemical; organic functional group, methyl; methoxy group content, 46% by weight
KBM13 . . . Methyltrimethoxysilane; manufactured by Shin-Etsu Chemical
[1)] Weight-average molecular weight of the siloxane derivative(s) determined by gel permeation method. When multiple siloxane derivatives are used, the weighted-average value of the weight-average molecular weights thereof is shown.
[2)] Amount (parts by weight) of the silica fine particles used per 100 parts by weight of all silicone derivative(s).
[3)] Amount (parts by weight) of the surface-treating agent used per 100 parts by weight of all metal salt(s) to be surface-treated.
[4)] Amount (parts by weight) of the metal oxide fine particles used per 100 parts by weight of all silicone derivative(s).

TABLE 2

|  |  | Comparative Example 1 | Comparative Example 2 | Comparative Example 3 | Comparative Example 4 |
|---|---|---|---|---|---|
| Silicone derivative | Siloxane derivative | X-40-9225 | X-40-9225 | X-40-9225 | prepared derivative |
|  | Weight-average molecular weight[1)] | 3000 | 3000 | 3000 | 250 |
|  | Other | — | — | — | — |
| Fine silica particles (fine particles A) | Kind | Snowtex OS | Snowtex OS | — | Snowtex O-40 |
|  | Average particle diameter (nm) | 8 | 8 | — | 20 |
|  | Content[2)] | 20 | 20 | — | 36 |
| Metal oxide fine particles (fine particles B) | Precursor (metal salt) | — | — | titanium oxide | anhydrous zinc acetate |
|  | Surface-treating agent Kind | — | — | — | KBM13 |
|  | Weight-average molecular weight | — | — | — | 136.2 |
|  | Amount used[3)] | — | — | — | 83 |
|  | Average particle diameter (nm) | — | — | — | 10 |
|  | Maximum-absorption wavelength (nm) | — | — | — | 370 |
|  | Luminance-maximum wavelength (nm) | — | — | — | 470 |
|  | Content[4)] | — | — | 12.5 | 5.0 |
| Other | Ultraviolet absorber | — | Tinuvin 328 | — | — |
| Light-transmitting property | Light transmittance (%) 600 (nm) | 92 | 90 | 72 | — |
|  | 450 (nm) | 92 | 89 | 58 | — |
|  | 300 (nm) | 91 | 37 | 6 | — |
| Heat resistance | Appearance | — | B | — | — |

TABLE 2-continued

| | | Comparative Example 1 | Comparative Example 2 | Comparative Example 3 | Comparative Example 4 |
|---|---|---|---|---|---|
| Weatherability | Retention of luminescence intensity (%) | 5 | — | — | — |

*X-40-9225 . . . Siloxane derivative containing alkoxysilyl group at molecular end; manufactured by Shin-Etsu Chemical; organic functional group, methyl; methoxy group content, 24% by weight
KBM13 . . . Methyltrimethoxysilane; manufactured by Shin-Etsu Chemical
[1] Weight-average molecular weight of the siloxane derivative(s) determined by gel permeation method. When multiple siloxane derivatives are used, the weighted-average value of the weight-average molecular weights thereof is shown.
[2] Amount (parts by weight) of the silica fine particles used per 100 parts by weight of all silicone derivative(s).
[3] Amount (parts by weight) of the surface-treating agent used per 100 parts by weight of all metal salt(s) to be surface-treated.
[4] Amount (parts by weight) of the metal oxide fine particles used per 100 parts by weight of all silicone derivative(s).

It can be seen from the results that the compositions of the Examples has high transmitting property in the visible light region and can satisfactorily block ultraviolet rays, as compared with the compositions of the Comparative Examples. A comparison between Example 1 and Comparative Example 1 suggests that weatherability is greatly improved merely by incorporating metal oxide fine particles. Furthermore, it is apparent from a comparison between Example 1 and Comparative Example 2 that incorporation of metal oxide fine particles brings about better heat resistance than incorporation of the general ultraviolet absorber.

While the invention has been described in detail with reference to specific embodiments thereof, it will be apparent to one skilled in the art that various changes and modifications can be made therein without departing from the spirit and scope thereof.

Incidentally, the present application is based on Japanese Patent Application No. 2010-019889 filed on Feb. 1, 2010, and the contents are incorporated herein by reference.

All references cited herein are incorporated by reference herein in their entirety.

Also, all the references cited herein are incorporated as a whole.

The silicone resin composition of the invention is suitable for use as, for example, a protective sheet or protective film for protecting substrates having poor resistance to ultraviolet rays.

What is claimed is:

1. A silicone resin composition comprising a silicone resin and metal oxide fine particles dispersed therein in a pH range of 2-4, the silicone resin comprising a siloxane derivative having at least one selected from the group consisting of an alkoxysilyl group and a silanol group at a molecular end thereof and having a weight average molecular weight (Mw) as determined by a gel permeation method of 300 to 6,000, directly bonded to silica fine particles having silanol groups on a surface, wherein the siloxane derivative has an alkoxy group in an amount of 10 to 45% by weight per one molecule thereof.

2. The silicone resin composition according to claim 1, wherein the siloxane derivative contains a disilanol derivative which has a silanol group at each of both molecular ends thereof and has a weight-average molecular weight as determined by the gel permeation method of 300 to 3,000.

3. The silicone resin composition according to claim 1, wherein the silica fine particles have an average particle diameter of 1 to 100 nm.

4. The silicone resin composition according to claim 3, wherein the silica fine particles are a colloidal silica having an average particle diameter of 1 to 100 nm.

5. The silicone resin composition according to claim 1, wherein the metal oxide fine particles have an average particle diameter of 1 to 100 nm and a maximum-absorption wavelength of 250 to 450 nm.

6. The silicone resin composition according to claim 1, wherein the metal oxide fine particles are fine particles obtained by treating surfaces of fine particles of at least one metal oxide selected from the group consisting of titanium oxide, zinc oxide and cerium oxide, with a silane derivative having an alkoxysilyl group at a molecular end thereof and having a weight-average molecular weight (Mw) as determined by the gel permeation method of 100 to 1,000.

7. The silicone resin composition according to claim 6, wherein the silane derivative is a compound represented by formula (IV):

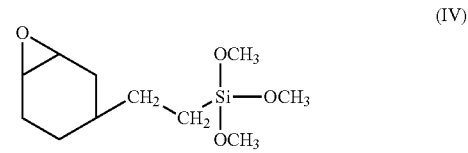

(IV)

or a compound represented by formula (V):

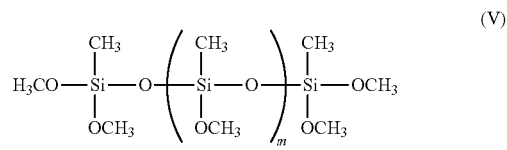

(V)

wherein m represents an integer of 1 or larger.

8. A hardcoat material obtained by applying the silicone resin composition according to claim 1 on a substrate and drying the composition.

9. A silicone resin sheet obtained by applying the silicone resin composition according to claim 1 on a substrate and drying the composition.

10. A silicone resin film obtained by applying the silicone resin composition according to claim 1 on a substrate and drying the composition.

* * * * *